(12) United States Patent
Bell et al.

(10) Patent No.: US 10,635,933 B2
(45) Date of Patent: Apr. 28, 2020

(54) VISION-BASED METHODS AND SYSTEMS FOR DETERMINING TRAILER PRESENCE

(71) Applicant: Ford Global Technologies, LLC, Dearborn, MI (US)

(72) Inventors: Robert Bell, New Hudson, MI (US); Brian Grewe, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/878,107

(22) Filed: Jan. 23, 2018

(65) Prior Publication Data
US 2019/0228258 A1 Jul. 25, 2019

(51) Int. Cl.
*B60R 1/00* (2006.01)
*G06K 9/62* (2006.01)
*G06T 7/70* (2017.01)

(52) U.S. Cl.
CPC .......... *G06K 9/6212* (2013.01); *B60R 1/003* (2013.01); *G06T 7/70* (2017.01); *G06T 2207/30252* (2013.01)

(58) Field of Classification Search
CPC .............. G06K 9/6212; G06T 7/70; G06T 2207/30252; B60R 1/003
See application file for complete search history.

(56) References Cited

U.S. PATENT DOCUMENTS

| | | | |
|---|---|---|---|
| 2015/0321697 A1* | 11/2015 | Lu | B60D 1/245 701/28 |
| 2017/0008521 A1* | 1/2017 | Braunstein | G01C 21/32 |
| 2017/0129403 A1* | 5/2017 | Lavoie | B60R 1/00 |
| 2017/0341583 A1* | 11/2017 | Zhang | G06T 7/73 |
| 2018/0032821 A1* | 2/2018 | Lavoie | G06T 7/60 |
| 2018/0061239 A1* | 3/2018 | Prasad | G08G 1/167 |
| 2018/0068566 A1* | 3/2018 | Prasad | G08G 1/167 |

OTHER PUBLICATIONS

Caup et al., *Video-based Trailer Detection and Articulation Estimation*, Intelligent Vehicles Symposium (IV), 2013 IEEE, retrieved from https://www.ini.rub.de/upload/file/1470692847_6f07e8111562167b1fa0/caupetal_videobasedtrailerdetection_iv2013.pdf.

* cited by examiner

*Primary Examiner* — Howard D Brown, Jr.
(74) *Attorney, Agent, or Firm* — Frank Lollo; Eversheds Sutherland (US) LLP

(57) ABSTRACT

Methods and apparatus are disclosed for vision-based determining of trailer presence. An example vehicle includes a camera to capture a plurality of frames. The example vehicle also includes a controller to calculate feature descriptors for a set of features identified in a first frame, compute respective match magnitudes between the feature descriptors of the first frame and for a second frame, calculate respective feature scores for each feature of the set of features, and determine if a trailer is present by comparing a feature score of a feature to a threshold.

18 Claims, 4 Drawing Sheets

VISION-BASED METHODS AND SYSTEMS FOR DETERMINING TRAILER PRESENCE

TECHNICAL FIELD

The present disclosure generally relates to trailers and, more specifically, vision-based methods and systems for determining trailer presence.

BACKGROUND

Generally, vehicles include storage areas (e.g., trunks, truck beds, etc.) to store objects. In some instances, a driver and/or a passenger of the vehicle may have an object that is unable to fit within the storage area of the vehicle. In such instances, a trailer may be utilized to store and transport the object. Typically, the trailer that stores the object is connected to a rear of the vehicle to enable the vehicle to tow the trailer and the object stored within the trailer as the vehicle travels along a road.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vision-based methods and systems for determining trailer presence. An example disclosed vehicle includes a camera to capture a plurality of frames. The example vehicle also includes a controller to calculate feature descriptors for a set of features identified in a first frame, compute respective match magnitudes between the feature descriptors of the first frame and for a second frame, calculate respective feature scores for each feature of the set of features, and determine if a trailer is present by comparing a feature score of a feature to a threshold.

An example disclosed method for determining a trailer is connected to a vehicle includes capturing, via a camera, a plurality of frames. The example method also includes calculating, via a processor, feature descriptors for a set of features identified in a first frame, computing, via the processor, respective match magnitudes between the feature descriptors of the first frame and for a second frame, calculating, via the processor, respective feature scores for each feature of the set of features, and determining, via the processor, if a trailer is present by comparing a feature score of a feature to a threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
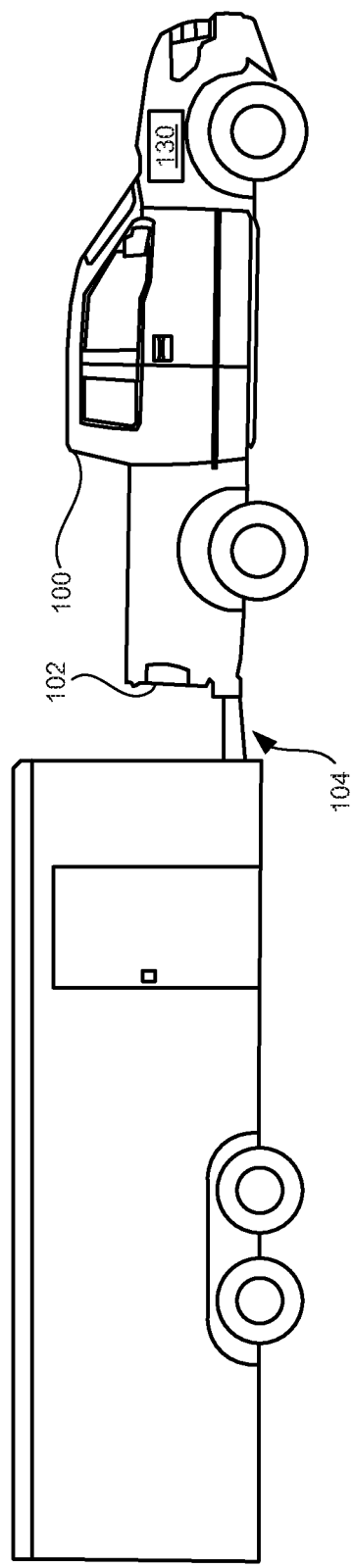
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, vehicles include storage areas (e.g., trunks, truck beds, etc.) to store objects. In some instances, a driver and/or a passenger of the vehicle may have an object that is unable to fit within the storage area of the vehicle. In such instances, a trailer may be utilized to transport the object from one location to another location. Typically, the trailer is connected to a hitch that is located toward a rear side of the vehicle to enable the vehicle to tow the trailer and object(s) stored within the trailer as the vehicle travels along a road.

Some vehicles and trailers include sensors for detecting when a trailer is coupled or decoupled from a vehicle. For example, a vehicle may include a system to generate a "Trailer Lamp Connected" signal when a lamp of the trailer coupled to the vehicle is detected (e.g., when a trailer lamp connector is connected). However, such systems may produce false positives (e.g., generating a positive "Trailer Lamp Connected" signal when no trailer is coupled to the vehicle or generating a negative "Trailer Lamp Connected" signal (or a "Trailer Lamp Not Connected" signal) when a trailer is coupled to the vehicle) by a lighted hitch lamp, the user not plugging in a connector for detecting the status of the trailer lamp, etc. Vehicles may additionally or alternatively include a system for generating a "Trailer Brake Connected" signal. However, such systems may only produce the "Trailer Brake Connected" signal if the coupled trailer includes brakes.

In other instances, other systems of the vehicle may use a trailer connected signal in their calculations. For example, a system of the vehicle that performs trailer-sway control may use the trailer connected signal to determine whether to perform trailer sway procedures to reduce trailer sway while the vehicle is traveling along the road. Having a reliable trailer connected signal may eliminate (or reduce the quantity of) false activations when no trailer is attached and non-activations of control in situations where a trailer is present and trailer sway control is warranted. Another example system that may benefit from a reliable trailer connected signal includes state estimation signals that attempt to estimate surface mu based longitudinal inertial signals. These state estimation signals may not be accurate if a trailer is connected, and, hence, determining trailer connected status is imperative prior to running the state estimation calculations. Additional systems that may benefit from a reliable trailer connected signal include stability control systems that generally control stability of the vehicle (e.g. trailer sway control, yaw control, etc.) and autonomous vehicle control systems that need to know when there is a trailer connected to the vehicle to determine whether to adjust state estimation and/or path planning of the autonomous vehicle. Thus, a system that reliably generates a trailer connected signal when a trailer is coupled (or connected) to the vehicle may be useful in improving state estimation and control of the vehicle.

Examples disclosed herein utilize a rear view camera (or cameras) of a vehicle to capture a burst of frames and a trailer presence controller to process the captured frames to reliably and robustly generate a trailer connected signal when a trailer is connected to the vehicle. Example methods and apparatus disclosed herein include a trailer presence system that processes images (e.g., frames of a burst of frames) to reliably determine trailer presence.

The example trailer presence system includes a rear view camera to capture a plurality of images of a region where a trailer tongue is (or would be) when a trailer is connected to the vehicle (e.g., to the hitch of the vehicle). The example trailer presence system also includes a trailer presence controller to process the images provided by the camera and determine whether a trailer is connected to the vehicle based on the processed images. For example, the trailer presence controller may identify a plurality of features (or points of interest) in a first frame of the plurality of images and then track (or attempt to track) the features through the subsequent frames of the plurality of images. If the trailer presence controller is able to track a quantity of the features through the subsequent frames, then the trailer presence controller determines that the feature is relatively stationary and determines that a trailer is connected to the vehicle. If the trailer presence controller is unable to track a quantity of the features through the subsequent frames, then the trailer presence controller determines that the feature is moving (e.g., such as the ground) and determines that a trailer is not connected to the vehicle.

In disclosed examples, the trailer presence system determines whether a trailer is present by (1) identifying features in a first frame of images captured by the rear view camera, (2) computing feature descriptors that uniquely identify each of the identified features, (3) determining a match magnitude between the feature descriptors of the first frame and a subsequent frame of the images captured by the rear view camera, (4) calculating a feature score for each of the identified features, and (5) determining whether a trailer is connected to the vehicle based on a comparison of feature scores of a subset of the features to respective thresholds.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). The vehicle 100 of the illustrated example includes an engine. For example, the engine includes an internal combustion engine, an electric motor, a hybrid engine and/or any other power source that propels movement of the vehicle 100.

The example vehicle 100 of FIG. 1 includes a rear view camera 102. In the illustrated example, the camera 102 captures frames for one second at a rate of 30 frames per second. However, it should be appreciated that the camera 102 could additionally or alternatively capture frames for different durations (e.g., two seconds, five seconds, etc.) and/or at different rates (e.g., 60 frames per second, etc.). The camera 102 (or cameras) may be any type of camera configured to communicate with the vehicle 100 via a communication protocol. For example, a wireless camera 102 may stream or transmit data to the vehicle 100 via a Wi-Fi communication protocol. A wired camera 102 may stream or transmit data to the vehicle 100 via a data bus (such as example vehicle data bus 210 of FIG. 2). The example camera 102 captures images or video (e.g., a burst of frames) of a region 104 proximate to the vehicle 100 where a trailer tongue is (or would be) when a trailer is connected to the vehicle 100 (e.g., to the hitch of the vehicle 100). In some examples, the camera 102 receives instructions from and communicates data to an example trailer presence controller 130. For example, the trailer presence controller 130 may instruct the camera 102 when to capture a burst of frames. The camera 102 may then stream or transmit the captured frames to the trailer presence controller 130 for processing and to determine whether a trailer is coupled to the vehicle 100.

The trailer presence controller 130 is configured to receive image data and/or video data from the camera 102, process the data, and determine whether a trailer is coupled (or connected) to the vehicle 100. As disclosed below in connection with FIG. 3, the trailer presence controller 130 processes the data by identifying a plurality of features in a frame of the received camera data and then tracking (or attempting to track) those features through subsequent frames of the camera data. If the trailer presence controller 130 is able to track the features through the subsequent frames of the camera data with a level of confidence, then the trailer presence controller 130 determines that the features are stationary and that a trailer is connected to the vehicle 100. If the trailer presence controller 130 is unable to track the features through the subsequent frames of the camera data with a level of confidence, then the trailer presence controller 130 determines that the features are moving (e.g., such as the ground) and that a trailer is not connected to the vehicle 100. If the trailer presence controller 130 is unable to determine that the features are either (1) stationary or (2) moving with a level of confidence, then the trailer presence controller 130 determines that the state of the trailer presence is indeterminate and re-initiates the trailer presence determination procedure.

Figure 2:
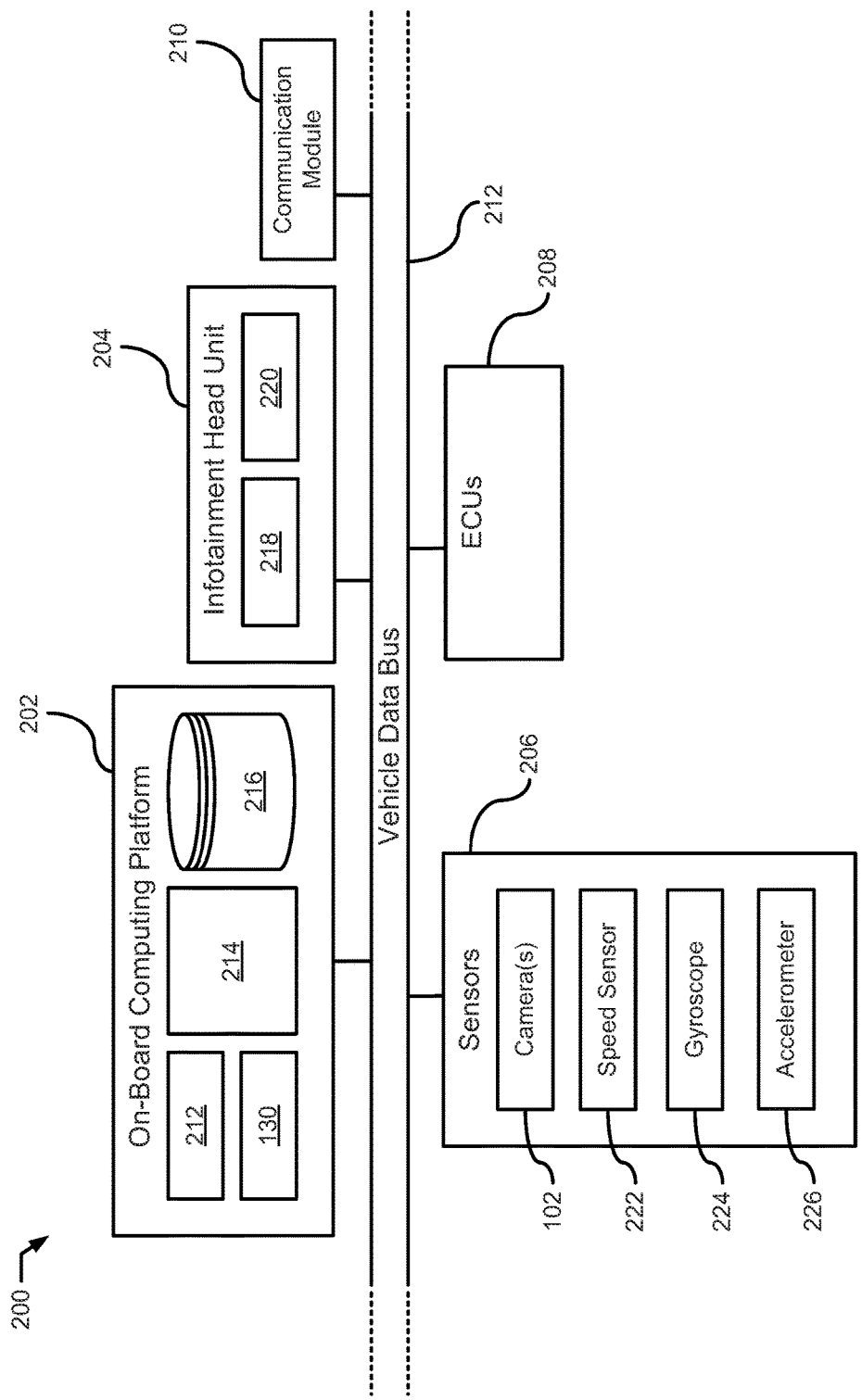
FIG. 2 is a block diagram of electronic components of the vehicle of FIG. 1.

FIG. 2 is a block diagram of electronic components 200 of the vehicle 100. As illustrated in FIG. 2, the electronic components 200 include an on-board computing platform 202, an infotainment head unit 204, sensors 206, electronic control units (ECUs) 208, a communication module 210, and a vehicle data bus 212.

The on-board computing platform 202 includes a microcontroller unit, controller or processor 212, memory 214, and a database 216. In some examples, the processor 212 of the on-board computing platform 202 is structured to include the trailer presence controller 130. Alternatively, in some examples, the trailer presence controller 130 is incorporated into another electronic control unit (ECU) with its own processor 212, memory 214, and/or database 216. The database 216 stores, for example, entries that correspond to information provided by the trailer presence controller 130. For example, the trailer presence controller 130 may record in the database 216 information such sets of features, positions of the features, feature descriptors associated with features, match magnitudes related to the features, feature scores, etc. However, it should be appreciated that the trailer presence controller 130 may record additional or alternative information in the database 216. The trailer presence controller 130 may process the stored information to determine whether a trailer is connected (or coupled) to the vehicle 100.

The processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 is computer readable media on which one or more sets of instructions, such as software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 204 provides an interface between the vehicle 100 and the user. The infotainment head unit 204 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include actuators, a display 218 (e.g., a cluster output, a heads-up display, a center console display such as a liquid crystal display (LCD), an organic light emitting diode (OLED) display, a flat panel display, a solid state display, etc.), and/or speakers 220. For example, the infotainment head unit 204 includes hardware (e.g., a processor or controller, memory, storage, etc.) and software (e.g., an operating system, etc.) for an infotainment system (such as SYNC® and MyFord Touch® by Ford®). Additionally, the infotainment head unit 204 displays the infotainment system on, for example, a center console display.

The sensors 206 are arranged in and around the vehicle 100 to monitor properties of the vehicle 100 and/or an environment in which the vehicle 100 is located. One or more of the sensors 206 may be mounted to measure properties around an exterior of the vehicle 100. Additionally or alternatively, one or more of the sensors 206 may be mounted inside a cabin of the vehicle 100 or in a body of the vehicle 100 (e.g., an engine compartment, wheel wells, etc.) to measure properties in an interior of the vehicle 100. For example, the sensors 206 include accelerometers, odometers, tachometers, pitch and yaw sensors, wheel speed sensors, microphones, tire pressure sensors, biometric sensors, cameras, and/or sensors of any other suitable type.

In the illustrated example, the sensors 206 include the camera(s) 102 of FIG. 1, speed sensors 222, a gyroscope 224, and an accelerometer 226. The example speed sensors 222 are configured to determine a speed at which the vehicle 100 is moving. The example gyroscope 224 measures a pitch, roll, yaw, or other change in the vehicle 100. The example accelerometer 226 measures an acceleration of the vehicle 100.

The ECUs 208 monitor and control the subsystems of the vehicle 100. For example, the ECUs 208 are discrete sets of electronics that include their own circuit(s) (e.g., integrated circuits, microprocessors, memory, storage, etc.) and firmware, sensors, actuators, and/or mounting hardware. The ECUs 208 communicate and exchange information via a vehicle data bus (e.g., the vehicle data bus 212). Additionally, the ECUs 208 may communicate properties (e.g., status of the ECUs 208, sensor readings, control state, error and diagnostic codes, etc.) to and/or receive requests from each other. For example, the vehicle 100 may have seventy or more of the ECUs 208 that are positioned in various locations around the vehicle 100 and are communicatively coupled by the vehicle data bus 212.

The communication module 210 includes one or more antennas configured to receive data from one or more sources. For example, the communication module 210 may be communicatively coupled to the camera 102 and the trailer presence controller 130.

The vehicle data bus 212 communicatively couples the on-board computing platform 202, the infotainment head unit 204, the sensors 206, the ECUs 208, and the communication module 210. In some examples, the vehicle data bus 212 includes one or more data buses. The vehicle data bus 212 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
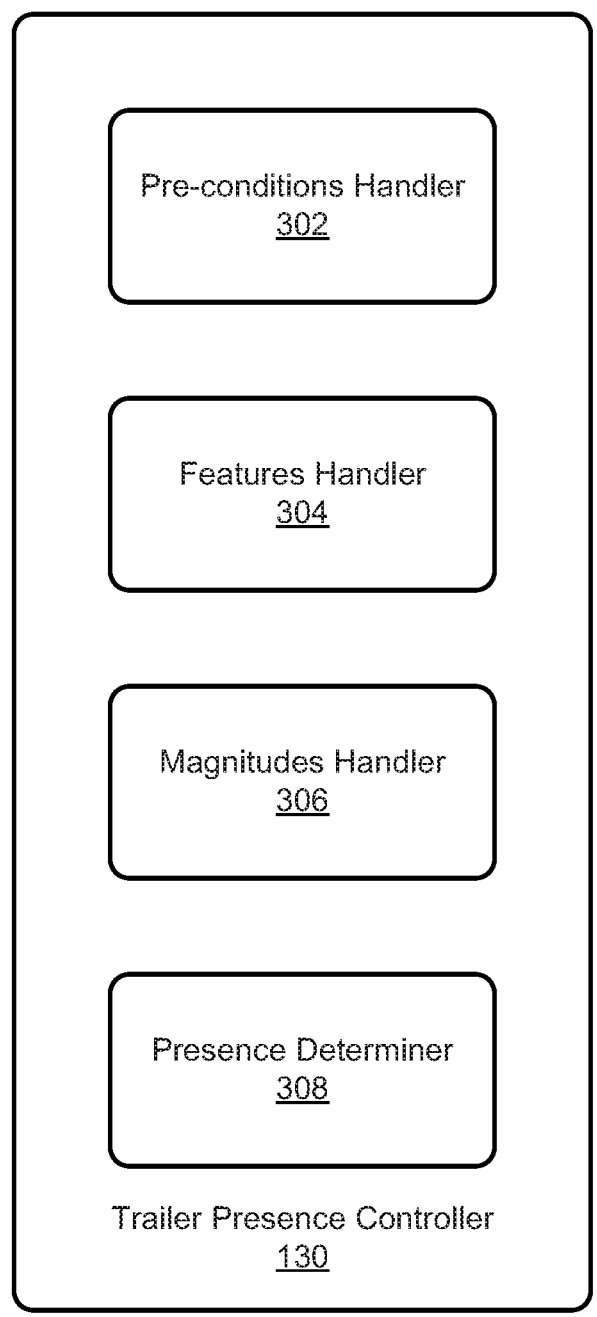
FIG. 3 is a block diagram of the example trailer presence controller of FIG. 1 and/or FIG. 2.

FIG. 3 is a block diagram of the example trailer presence controller 130 of FIG. 1 and/or FIG. 2. The example trailer presence controller 130 of FIG. 3 includes a pre-conditions handler 302, a features handler 304, a magnitudes handler 306 and a presence determiner 308.

In the illustrated example of FIG. 3, the trailer presence controller 130 includes the example pre-conditions handler 302 to detect when one or more pre-condition events occurred. For example, the pre-conditions handler 302 may receive speed and direction information from the example speed sensor 222 of FIG. 2. The pre-conditions handler 302 may then determine that a pre-condition event occurred when the vehicle 100 satisfies a speed threshold (e.g., the vehicle 100 is traveling in a forward direction at a speed of at least five miles per hour, etc.). Additionally or alternatively, the pre-conditions handler 302 may determine a pre-condition event occurred in response to receiving longitudinal acceleration information from the accelerometer 226 of FIG. 2 and determining that the longitudinal acceleration of the vehicle 100 is relatively constant. Additionally or alternatively, the pre-conditions handler 302 may determine a pre-condition event occurred in response to receiving axle and yaw rate information from the gyroscope 224 of FIG. 2 and determining that the axle and yaw rate of the vehicle 100 is relatively constant. By waiting to determine that the axle and yaw rate of the vehicle 100 is relatively constant, the trailer presence controller 130 removes (or at least reduces) scenarios where the trailer is jolting or bouncing while traveling along the road.

In the illustrated example, in response to detecting that one or more pre-condition event(s) occurred, the pre-conditions handler 302 instructs the camera 102 of FIG. 1 and/or FIG. 2 to capture the burst of frames. The example pre-conditions handler 302 also crops frames received by the camera 12. For example, the pre-conditions handler 302 may crop each of the frames of the burst of frames captured by the camera 102 to a 200 by 200 pixel window that captures where the trailer tongue is (or would be) when a trailer is connected to the vehicle 100. By cropping the frames, the pre-conditions handler 302 focuses each frame on the region associated with the trailer tongue and removes extraneous information from the frame, such as cars, and, thereby, improve processing speed when determining presence of a trailer.

In the illustrated example of FIG. 3, the trailer presence controller 130 includes the example features handler 304 to identify features for tracking throughout the frames. The example features handler 304 identifies features (or points of interest) that are distinguishable and spread apart from each other across the frame. The trailer presence controller 130 tracks (or attempts to track) the identified features through the burst of frames. As disclosed below, if the trailer presence controller 130 is able to track a subset of the identified features through the burst of frames, the trailer presence controller 130 determines that a trailer is present (e.g., the feature remained relatively stationary throughout the frames).

To identify features, the example features handler 304 of FIG. 3 computes a Harris corner response across the first frame of the burst of frames. The example features handler 304 then uses a non-maximal suppression technique to compute a dilated Harris response. If the pixel magnitude at a point (e.g., an (x, y) pixel location) of the dilated Harris response matches with the un-dilated Harris corner response, the point is at a local maxima within the dilation span and the features handler 304 identifies that point as a feature. The example features handler 304 then selects a set of the identified features for further processing. For example, the features handler 304 may select the 15 points with the highest Harris corner response magnitudes for further processing and discard the remaining features. However, it should be appreciated that other techniques for identifying features in a frame may additionally or alternatively be used. For example, the features handler 304 may identify features by identifying lines (known as "edges") in the frame and randomly selecting points from the region within the outermost edges. Additionally or alternatively, the features handler 304 may identify features by selecting features in a pre-defined and evenly spaced (X-Y) grid pattern.

The example features handler 304 then computes a feature descriptor for each of the identified features. A feature descriptor uniquely identifies a feature in a frame. In the illustrated example, the feature descriptors calculated by the features handler 304 are local and based on the appearance of the frame at the feature point, and are, generally, invariant to image scale and rotation. They are also generally invariant to changes in illumination, noise, and minor changes in viewpoint. The feature descriptors calculated by the features handler 304 are also highly distinctive (e.g., unique identifiers), relatively easy to extract and allow for correct tracking of features across frames with low probability of mismatch, and facilitate computing in close-to-real time. The example features handler 304 of FIG. 3 uses feature detection techniques (e.g., a scale-invariant feature transform (SIFT) technique, a speeded up robust features (SURF) technique, convolution neural network for semantic segmentation or feature detection, etc.) to compute the feature descriptor for each of the identified features.

The example features handler 304 calculates the feature descriptors for each of the features of the first frame. Because the vehicle 100 is moving relatively stable during the time when the camera 102 captures the burst of frames (e.g., the vehicle 100 has a relatively constant longitudinal acceleration, a relatively constant axle and yaw rate, etc.), the features handler 304 uses the positions of the features of the first frame (e.g., the (x, y) location of the feature points) as the positions of the features in the subsequent frames of the burst of frames. The example features handler 304 then calculates feature descriptors for each of the features of the subsequent frames of the burst of frames.

In the illustrated example of FIG. 3, the trailer presence controller 130 includes the example magnitudes handler 306 to calculate match magnitudes between feature descriptors of the same feature across different frames. Match magnitudes represent how close two features are to being the same object. For example, if a feature is the same across two frames, then the match magnitude for the feature between those two frames will be relatively high. In contrast, if a feature in a first frame is different than a feature in a second frame, then the match magnitude for the feature between those two frames will be relatively low.

The example magnitudes handler 306 of FIG. 3 calculates the match magnitudes of a feature by comparing the feature descriptor of the selected feature of the first frame to the feature descriptor of the selected feature of a subsequent frame (e.g., a second frame) of the burst of frames. For example, if a feature descriptor is a histogram, the magnitudes handler 306 may compare the intersection (e.g., similarity) between the histograms to calculate the match magnitudes. The magnitudes handler 306 then repeats this calculation for each of the subsequent frames by comparing the feature descriptor from a current frame to the first frame. For example, for a first feature, the magnitudes handler 306 calculates a first match magnitude by comparing the feature descriptor of the first feature in the first frame to the feature descriptor of the first feature in a second frame, calculates a second match magnitude by comparing the feature descriptor of the first feature in the first frame to the feature descriptor of the first feature in a third frame, etc. The magnitudes handler 306 of FIG. 3 repeats these calculations for each of the features of the set of features. For example, if the burst of frames includes 30 frames and the set of features includes 15 features, the magnitudes handler 306 calculates 435 (e.g., 29×15=435) match magnitudes. The example magnitudes handler 306 may store the calculated match magnitudes in the example database 216 of FIG. 2.

The example magnitudes handler 306 then calculates a feature score for each of the features of the set of features based on the calculated match magnitudes. In the illustrated example, the magnitudes handler 306 of FIG. 3 calculates a feature score for a selected feature by averaging the calculated match magnitudes for the selected feature across each of the frames of the burst of frames. Features that are the same across frames will have relatively high feature scores, while features that are different across frames will have relatively low feature scores.

In the illustrated example of FIG. 3, the trailer presence controller 130 includes the example presence determiner 308 to determine whether a trailer is present on the vehicle 100 based on the feature scores. The example presence determiner 308 of FIG. 3 identifies reference features from the set of features based on their respective feature scores. For example, the presence determiner 308 may select the three features of the set of features that have the highest feature scores as the reference frames. However, it should be appreciated that any quantity of features, including all of the features of the set of features, may be identified as reference features.

The example presence determiner 308 of FIG. 3 then compares the feature scores of the reference features to dual thresholds to determine whether a trailer is connected to the vehicle 100 or not connected to the vehicle 100. For example, the presence determiner 308 may first compare the feature scores of the reference features to a set of connected thresholds to determine if a trailer is connected to the vehicle 100. If the features scores of the reference features does not satisfy the set of connected thresholds, then the presence determiner 308 compares the feature scores of the reference features to a set of not connected thresholds to determine if a trailer is not connected to the vehicle 100. If the presence determiner 308 determines that the feature scores of the reference features does not satisfy the connected thresholds and the not connected thresholds, then the presence determiner 308 determines that the state of the trailer is indeterminate and instructs the pre-conditions handler 302 to wait until the pre-condition event(s) occur.

In the illustrated example, the set of connected thresholds and the set of not connected thresholds include different scores. For example, the set of connected thresholds may include a first score of 70, a second score of 60, and a third score of 50. The set of not connected thresholds may include a first score of 50, a second score of 45, and a third score of 40. Thus, for the presence determiner 308 to determine that a trailer is connected to the vehicle 100, the presence determiner 308 determines whether the first reference feature satisfies the first score of the connected thresholds (e.g., has a score greater than or equal to 70), whether the second reference feature satisfies the second score of the connected thresholds (e.g., has a score greater than or equal to 60), and whether the third reference feature satisfies the third score of the connected thresholds (e.g., has a score greater than or equal to 50). If the presence determiner 308 determines that each of the connected thresholds is not satisfied, then the presence determiner 308 is unable to determine that a trailer is connected to the vehicle 100.

The example presence determiner 308 of FIG. 3 then determines if a trailer is not connected to the vehicle 100 by comparing the reference features to the not connected thresholds. For example, the presence determiner 308 may determine that a trailer is not connected to the vehicle 100 if the first reference feature satisfies the first score of the not connected thresholds (e.g., has a score less than or equal to 50), if the second reference feature satisfies the second score of the not connected thresholds (e.g., has a score less than or equal to 45), and if the third reference feature satisfies the third score of the not connected thresholds (e.g., has a score less than or equal to 40). If the presence determiner 308 determines that each of the not connected thresholds is not satisfied, then the presence determine 308 is unable to determine that a trailer is not connected to the vehicle 100 (e.g., the state of the trailer presence is indeterminate).

The example presence determiner 308 then generates a signal based on the result of the comparisons. For example, the presence determiner 308 may generate a trailer connected signal if the reference features satisfied each of the connected thresholds. The example presence determiner 308 may generate a trailer not connected signal if the reference features satisfied each of the not connected thresholds. The example presence determiner 308 may generate an indeterminate signal if the reference features did not satisfy the connected thresholds and the not connected thresholds (e.g., each of the reference features did not satisfy the corresponding connected threshold and did not satisfy the corresponding not connected threshold).

Figure 4:
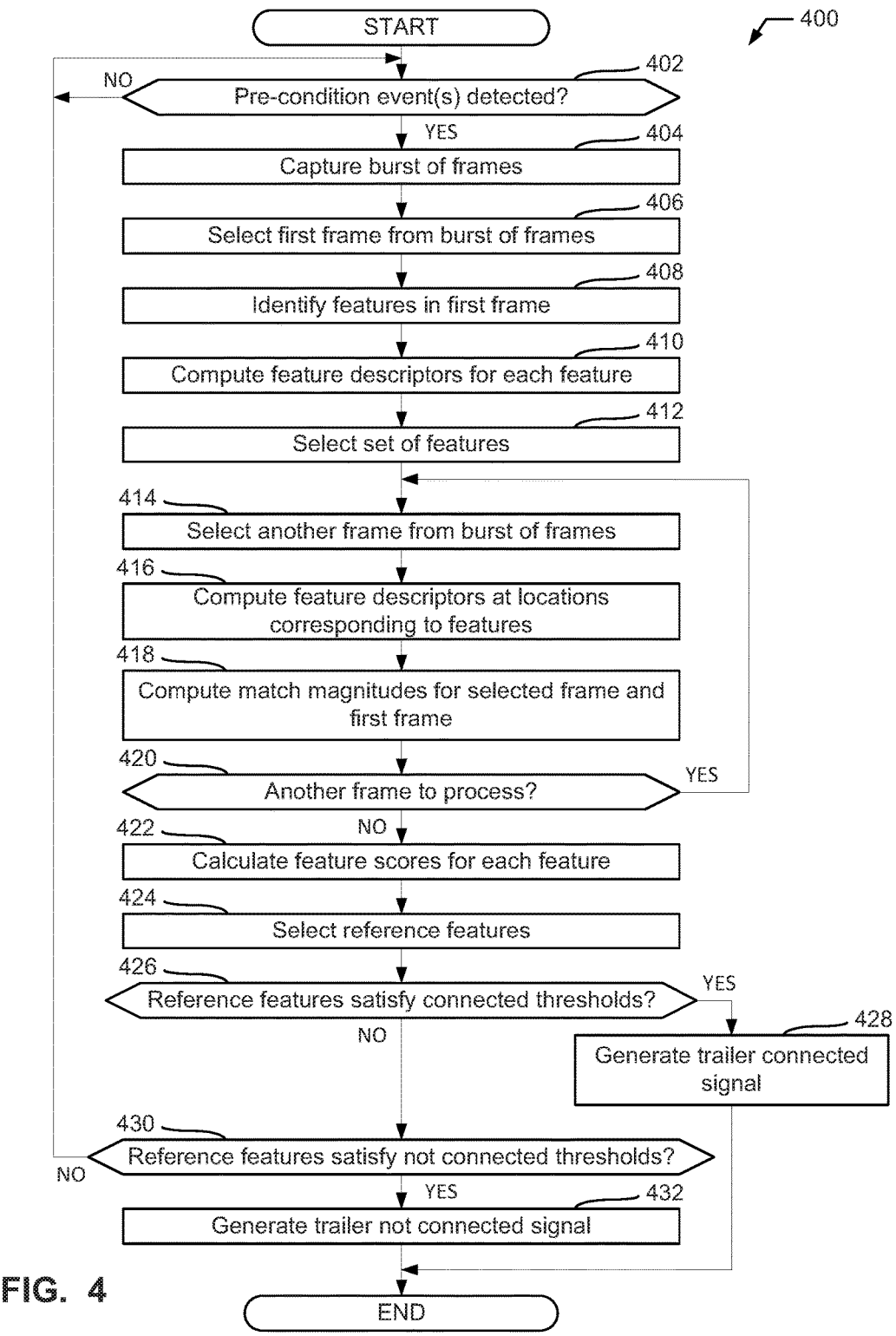
FIG. 4 is a flowchart for determining trailer presence with respect to the vehicle of FIG. 1 in accordance with the teachings herein.

FIG. 4 is a flowchart of an example method 400 for vision-based determining of trailer presence. The flowchart of FIG. 4 is representative of machine readable instructions that are stored in memory (such as the memory 214 of FIG. 2) and include one or more programs that, when executed (e.g., by a processor such as the processor 212 of FIG. 2)), cause the vehicle 100 to implement the example trailer presence controller 130 of FIG. 1, FIG. 2 and/or FIG. 3. While the example program is described with reference to the flowchart illustrated in FIG. 4, many other methods of implementing the example trailer presence controller 130 may alternatively be used. For example, the order of execution of the blocks may be rearranged, changed, eliminated, and/or combined to perform the method 400. Further, because the method 400 is disclosed in connection with the components of FIG. 1, FIG. 2 and/or FIG. 3, some functions of those components will not be described in detail below.

The example method 400 of FIG. 4 begins at block 402 when the example pre-conditions handler 302 of FIG. 3 determines whether pre-condition event(s) are detected. For example, the pre-conditions handler 302 may monitor one or more of the sensors 206 of FIG. 2 to determine if the vehicle 100 is travelling at a speed that satisfies a speed threshold (e.g., at least 5 miles per hour in a forward direction), has a relatively constant axle and yaw rate, has a relatively constant longitudinal acceleration, etc. If, at block 402, the example pre-conditions handler 302 did not detect one or more pre-condition event(s), then the method 400 returns to block 402 to wait to detect the pre-condition event(s).

If, at block 402, the pre-conditions handler 302 did detect one or more pre-condition event(s), then, at block 404, the camera 102 of FIG. 1 and/or FIG. 2 captures a burst of frames. For example, the pre-conditions handler 302 may instruct the camera 102 to capture a plurality of frames over a one second period. In some examples, the pre-conditions handler 302 crops the frames captured by the camera 102 to 200 by 200 windows.

At block 406, the example features handler 304 of FIG. 3 selects a first frame from the burst of frames for processing. At block 408, the features handler 304 identifies features in the first frame. For example, the features handler 304 may apply Harris corner response techniques to identify points of interest. At block 410, the features handler 304 applies feature detection techniques (e.g., SIFT techniques) to compute feature descriptors for each of the identified features. At block 412, the features handler 304 selects a set of features from the identified features. For example, the features handler 304 selects features from the identified features that have the relatively highest Harris corner response magnitudes to include in the set of features.

At block 414, the features handler 304 selects another frame from the burst of frames for processing. At block 416, the features handler 304 computes feature descriptors for the selected frames at locations of the selected frame that correspond to locations of the features included in the set of features. For example, a feature in the set of features may be positioned at an (x, y) location in the first frame. The features handler 304 then performs feature detection techniques (e.g., SIFT techniques) to compute feature descriptors for the feature at the same (x, y) location in the selected frame. The features handler 304 computes the feature descriptors for the selected frame for each of the features included in the set of features.

At block 418, the example magnitudes handler 306 of FIG. 3 computes match magnitudes for the selected frame and the first frame. For example, the magnitudes handler 306 compares the feature descriptors for each of the features in the first frame and the selected frame. As discussed above, relatively high match magnitudes correspond to the same feature (e.g., the same feature is tracked from the first frame to the selected frame), while relatively low match magnitudes correspond to different features (e.g., the feature at the (x, y) location in the first frame is different than the feature at the (x, y) location in the selected frame). The example magnitudes handler 306 may record the calculated match magnitudes in the example database 216 of FIG. 2.

At block 420, the trailer presence controller 130 determines whether there is another frame in the burst of frames to process. If, at block 420, the trailer presence controller 130 determines that there is another frame to process, control returns to block 414 to select another frame from the burst of frames to process.

If, at block 420, the trailer presence controller 130 determines that there is not another frame to process (e.g., all of the frames of the burst of frames have been processed), then, at block 422, the magnitudes handler 306 calculates feature scores for each of the features of the set of features. For example, the magnitudes handler 306 may retrieve the computed match magnitudes for a selected feature (e.g., the first feature of the set of features) across all of the frames of the burst of frames and calculate the feature score for the selected feature by averaging the retrieved match magnitudes. The magnitudes handler 306 calculates the feature score for each of the features included in the set of features.

At block 424, the example presence determiner 308 selects reference features from the set of features based on their respective feature scores. For example, the presence determiner 308 may select the three features of the set of features that have the highest feature scores as the reference frames.

At block 426, the presence determiner 308 determines whether the reference features satisfy a set of connected thresholds. For example, the presence determiner 308 may compare the feature scores of the reference features to a set of connected thresholds to determine if a trailer is connected to the vehicle 100. If, at block 426, the presence determiner 308 determines that the reference features satisfy the connected thresholds (e.g., each of the reference features satisfied the corresponding connected threshold), then, at block 428, the presence determiner 308 generates a trailer connected signal. The example method 400 of FIG. 4 then ends.

If, at block 426, the presence determiner 308 determines that the reference features do not satisfy the connected thresholds (e.g., each of the reference features did not satisfy the corresponding connected threshold), then, at block 430, the presence determiner 308 determines whether the reference features satisfy a set of not connected thresholds. For example, the presence determiner 308 may compare the feature scores of the reference features to a set of not connected thresholds to determine that a trailer is not connected to the vehicle 100. If, at block 430, the presence determiner 308 determines that the reference features satisfy the not connected thresholds (e.g., each of the reference features satisfied the corresponding not connected threshold), then, at block 432, the presence determiner 308 generates a trailer not connected signal. The example method 400 of FIG. 4 then ends.

If, at block 430, the presence determiner 308 determines that the reference features do not satisfy the not connected thresholds (e.g., each of the reference features did not satisfy the corresponding not connected threshold), then control returns to block 402 to await for one or more pre-condition event(s) to occur. For example, the presence determiner 308 is unable to determine whether a trailer is connected or not connected based on the frames included in the burst of frames (e.g., the state of the trailer presence is indeterminate). Accordingly, the method 400 returns to block 402 to execute the trailer presence procedure to make a vision-based determination of whether a trailer is present (e.g., connected or coupled) to the vehicle 100. In some examples, the presence determiner 308 may generate an indeterminate signal to indicate that the results based on the current burst of frames was indeterminate and that the program of FIG. 4 should be re-executed.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a camera to capture a plurality of frames;
a controller to:
calculate feature descriptors for a set of features identified in a first frame;
compute respective match magnitudes between the feature descriptors of the first frame and for a second frame;
compute the match magnitude for each of the features in the set of features by:
calculating feature descriptors for the second frame based on respective locations of features in the first frame; and
computing a match magnitude between a feature descriptor of the first frame and a corresponding feature descriptor of the second frame;
calculate respective feature scores for each feature of the set of features; and
determine if a trailer is present by comparing the feature score of a feature to a threshold.

2. The vehicle of claim 1, wherein the camera is to capture the plurality of frames in response to a determination that the vehicle is traveling at a speed that satisfies a speed threshold.

3. The vehicle of claim 1, wherein the camera is to capture the plurality of frames in response to a determination that longitudinal acceleration and yaw rate of the vehicle are relatively constant.

4. The vehicle of claim 1, wherein the controller is to identify features of the first frame by computing and utilizing Harris corner responses.

5. The vehicle of claim 1, wherein the match magnitude is based on a comparison of two histograms.

6. The vehicle of claim 1, wherein the controller is to calculate a feature score for a first feature of the set of features by averaging match magnitudes computed for the first feature for each of the frames of the plurality of frames.

7. The vehicle of claim 1, wherein the controller is to:
select reference features from the set of features based on their respective feature scores; and
determine that a trailer is present when the reference features satisfy a first set of thresholds.

8. The vehicle of claim 7, wherein the controller is to determine that a trailer is not present when the reference features satisfy a second set of thresholds.

9. The vehicle of claim 8, wherein the controller is to generate an indeterminate signal when the reference features do not satisfy the first set of thresholds and do not satisfy the second set of thresholds.

10. A vehicle comprising:
a camera to capture a plurality of frames;
a controller to:
calculate feature descriptors for a set of features identified in a first frame;
compute respective match magnitudes between the feature descriptors of the first frame and for a second frame;
compute respective match magnitudes between the feature descriptors of the first frame and for each subsequent frame of the plurality of frames;
calculate respective feature scores for each feature of the set of features; and
determine if a trailer is present by comparing the feature score of a feature to a threshold.

11. A method for determining a trailer is connected to a vehicle, the method comprising:
capturing, via a camera, a plurality of frames;
calculating, via a processor, feature descriptors for a set of features identified in a first frame;
computing, via the processor, respective match magnitudes between the feature descriptors of the first frame and for a second frame;
computing the respective match magnitude for each of the features in the set of features by:
calculating feature descriptors for the second frame based on respective locations of features in the first frame; and
computing a match magnitude between a feature descriptor of the first frame and a corresponding feature descriptor of the second frame;
calculating, via the processor, respective feature scores for each feature of the set of features; and
determining, via the processor, if a trailer is present by comparing the feature score of a feature to a threshold.

12. The method of claim 11, further including:
determining that the vehicle is traveling at a speed that satisfies a speed threshold; and
capturing the plurality of frames in response to the determination.

13. The method of claim 11, further including:
determining that longitudinal acceleration and yaw rate of the vehicle are relatively constant; and
capturing the plurality of frames in response to the determination.

14. The method of claim 11, wherein the match magnitude is based on a comparison of two histograms.

15. The method of claim 11, wherein the calculating of a feature score for a first feature of the set of features includes averaging match magnitudes computed for the first feature for each of the frames of the plurality of frames.

16. The method of claim 11, further including:
selecting reference features from the set of features based on their respective feature scores; and
determining e that a trailer is present when the reference features satisfy a first set of thresholds.

17. The method of claim 16, further including determining that a trailer is not present when the reference features satisfy a second set of thresholds.

18. The method of claim 17, further including generating an indeterminate signal when the reference features do not satisfy the first set of thresholds and do not satisfy the second set of thresholds.

* * * * *